United States Patent [19]

Pearce et al.

[11] 3,898,312

[45] Aug. 5, 1975

[54] METHOD OF FORMING IMPROVED BRIQUETTING OF CALCIUM CHLORIDE

[75] Inventors: Roscoe L. Pearce, Midland; Gerald C. Stalker, Bay City; John L. Arnold, Midland, all of Mich.

[73] Assignee: The Dow Chemical Company, Midland, Mich.

[22] Filed: June 29, 1973

[21] Appl. No.: 374,855

Related U.S. Application Data

[60] Division of Ser. No. 223,519, Feb. 4, 1972, Pat. No. 3,779,936, which is a continuation-in-part of Ser. No. 142,994, May 13, 1971, abandoned.

[52] U.S. Cl. ............................................. 264/122
[51] Int. Cl. ............................................ B01j 2/28
[58] Field of Search ........................... 264/109, 122

[56] References Cited
OTHER PUBLICATIONS

"Agglomeration," Chemical Engineering, Dec. 4, 1967, pp. 154, 155.

*Primary Examiner*—Robert F. White
*Assistant Examiner*—J. R. Hall
*Attorney, Agent, or Firm*—R. W. Selby

[57] ABSTRACT

An improved method for the briquetting of calcium chloride involving intermixing polyethylene glycol with the calcium chloride fines to be briquetted. The use of polyethylene glycol, which ranges in molecular weight from 1,000 to 200,000 and is employed in an amount of from 0.1 to 10 weight percent of the calcium chloride polyethylene glycol mixture, provides briquettes having distinct advantages over calcium chloride briquettes prepared without such an additive.

4 Claims, No Drawings

METHOD OF FORMING IMPROVED BRIQUETTING OF CALCIUM CHLORIDE

BACKGROUND OF THE INVENTION

This application is a division of copending application Ser. No. 223,519, filed Feb. 4, 1972, now U.S. Pat. No. 3,779,936, which is a continuation-in-part of application Ser. No. 142,994, filed May 13, 1971 and now abandoned.

Commercial grade calcium chloride is a widely used desiccant due to its low cost and high degree of hydroscopicity. In one application, calcium chloride, in the form of solid lumps or discrete particles, is charged to a gas drying column. As gases containing water vapor are passed through the bed of calcium chloride particles, water is picked up forming an aqueous calcium chloride solution which accumulates on the particle surfaces. Continued accumulation results in the solution flowing to the lower parts of the column. There exists a problem of the $CaCl_2$ crystallizing from the aqueous solution before it drains from the bed section. This crystallization can occur for example when a sudden drop in ambient temperature is experienced and is responsible for the phenomenon known as bridging. Bridging is the formation of a solid connecting link between the calcium chloride particles caused by the aforementioned crystallization. As the particles of calcium chloride continue to dissolve, these links form an interconnecting structure which may have enough strength to support the remainder of the bed. Continued bridging results in the formation of a solid $CaCl_2$ bed through which the gas has difficulty in passing. Normally, when bridging has occurred to a degree sufficient to restrict the flow of gas through the bed, tunnel-like pathways called channels are formed due to preferential flow of the gas. The net result of channeling is a reduction in the effective surface area of calcium chloride exposed to the gas stream. This reduction in surface area reduces the efficiency of the drying unit. Moreover, bridging tends to prevent the body of calcium chloride pellets from moving downwardly in the drying unit as the drying operation proceeds. Downward movement is desirable since it helps to free the desiccant particles from each other and restore drying efficiency.

The problem of bridging can be substantially reduced by preparing a spherical $CaCl_2$ particle. The reduced particle to particle contact sites provided by a bed of spheres permits drainage of the brine with less crystallization than is the case with pillow shaped briquettes. Spherical granules cannot be efficiently made by briquetting since $CaCl_2$ is one of the most difficult solids to briquette. Accordingly, spherical pellets are made by concentrating $CaCl_2$ brine, drying the resulting material on shelf dryers and segregating particles on appropriate screens; a process which is more costly than briquetting.

Bridging of pillow shaped particles made by briquetting can be reduced by mixing crystals such as NaCl or $Na_2CO_3$ with $CaCl_2$ fines and briquetting the mixture of salts. This method, which is disclosed in U.S. Pat. No. 3,334,468, effectively reduces the problem of bridging when from about 2 to 5 weight percent of NaCl or $Na_2CO_3$ is briquetted with the $CaCl_2$. However, the briquettes made from mixtures of $CaCl_2$ and NaCl tend to break up more readily than is desirable for gas field use.

Irregardless of the problem of bridging, it is advantageous to prevent the crystallization of $CaCl_2$ brine in a gas drying column. Such crystallization is undesirable because a saturated $CaCl_2$ solution (43%) possesses a significant desiccant capacity. This phenomena is taken advantage of in some drying columns by the use of recirculating trays. In this type of column, trays are placed at the bottom of the drying column to catch the brine and keep it in close proximity to the gas stream.

It is an object of the present invention to provide a method of briquetting composition, comprising $CaCl_2$ as the major component, which is suitable for desiccant use.

An additional object is to provide a method of making a calcium chloride composition and forming it into briquettes which are less susceptible to breakage during and after briquetting than are briquettes formed of pure $CaCl_2$.

An additional object is to provide an method of making briquettes from a composition whose saturated solutions recrystallize at lower temperatures than do $CaCl_2$ solutions containing no additive.

A further object is to provide a method of making briquettes from a composition which in the form of pillow shaped briquettes used in a gas drying column more effectively dries the stream than those compositions previously used.

SUMMARY OF THE INVENTION

The disclosed invention is a method of formulating and briquetting a composition of matter which comprises $CaCl_2$ as a major component in admixture with a polyethylene glycol (PEG) as a minor component. The polyethylene glycol, which has a molecular weight of from about 1,000 to 200,000, accounts for from 0.1 to 10 weight percent of the composition. The improved method of briquetting $CaCl_2$ involves adding polyethylene glycol to the $CaCl_2$ before compaction. The $CaCl_2$ composition used in the present invention forms a saturated solution which crystallizes at an unexpectedly low temperature and is therefore preferable to unaltered $CaCl_2$ for use as a desiccant.

DETAILED DESCRIPTION

In formulating the composition for briquetting, the $CaCl_2$ fines or particles are thoroughly mixed with the PEG particles. The shape or size of these particles is not critical; however, the PEG must be in the solid state. Particles of about the size and shape of soap flakes have been used effectively. Polyethylene glycols having molecular weights within the range of from 1,000 to 200,000 may be advantageously employed. A molecular weight range of from 2,000 to 60,000 is especially effective with the preferred molecular weight ranging from 4,000 to 9,000. The amount of PEG employed ranges from 0.1 up to about 10 weight percent of the $CaCl_2$ polypropylene glycol mixture. Preferred concentrations range from 1 to 3 weight percent.

The following examples will serve to further illustrate the invention. The briquettes used in these examples were prepared in a Komarck-Graves briquetter having a pocket size such that the briquette as 5/8 inch in the shortest dimension and 1 1/16 inches in the longest.

EXAMPLE I

Three separate sets of briquettes were prepared from $CaCl_2$ fines. Set No. 1 was prepared by compacting the fines without any additive, set No. 2 contained 3% polyethylene glycol 9,000 and set No. 3 contained 5% NaCl. Spherical agglomerates, one-half inch in diameter and prepared as described on page three, supra, were tested for tumbling attrition along with the briquettes of sets 1, 2 and 3.

The attrition test involved placing the material to be tested on a one-half inch screen which was agitated with a Ro-Tap vibrator. The drawing graphically represents the results of such testing. From the drawing it can be seen that those $CaCl_2$ briquettes containing 3% PEG 9000 were substantially more resistant to breakage than unaltered $CaCl_2$ briquettes or $CaCl_2$ briquettes containing NaCl and only slightly less resistant than the spherical particles.

Resistance to breakage is directly related to the efficacy of using briquettes in a gas drying column. Attrition during shipment results in the presence of fines in the shipping container. Since as a practical matter it is impossible to separate fines from unbroken briquettes in the gas fields, both forms of $CaCl_2$ find their way into the drying column. The presence of fines encourages the formation of a super saturated solution having a high freezing point. A high freezing point is directly related to bridging. Thus, increasing the resistance to breakage has a significant effect on bridging in the column due to reduction in the amount of $CaCl_2$ fines created during shipment.

EXAMPLE II

In order to determine the effect of the polyglycol additive on pelleting efficiency, replicate sets of up to 100 pellets were prepared on a hand operated pelletizer having a cavity of sufficient size to prepare a .18 inch by .41 inch pellet. Polyethylene glycols of varying molecular weights were employed as additives at various loadings. Calcium chloride pellets containing no PEG were prepared as a control. Table 1 sets out the various formulations tested as well as the percent of broken pellets observed for each formulation.

TABLE I

| Formulation Tested | % Broken Pellets |
|---|---|
| $CaCl_2$ (control) | 21.5 |
| $CaCl_2$+1% PEG 20,000 | 1.1 |
| $CaCl_2$+2% PEG 20,000 | 2.2 |
| $CaCl_2$+3% PEG 20,000 | 3.3 |
| $CaCl_2$+4% PEG 20,000 | 1.1 |
| $CaCl_2$+5% PEG 20,000 | 1.1 |
| $CaCl_2$+3% PEG 1450 | 1.7 |
| $CaCl_2$+3% PEG 6000 | 1.7 |
| $CaCl_2$+3% PEG 9000 | 1.7 |

We claim:

1. A method for briquetting calcium chloride, comprising:
   a. mixing thoroughly particulate calcium chloride with solid particulate polyethylene glycol, said polyethylene glycol having a molecular weight in the range of from 1,000 to 200,000 and being employed in an amount in the range of 0.1 to 10 weight per cent based on the weight of the calcium chloridepolyethylene glycol mixture;
   b. placing said thoroughly mixed mixture in a briquetting machine;
   c. and forming briquettes of said mixture.

2. The method of claim 1 wherein the molecular weight of the polyethylene glycol employed is within the range of from 2,000 to 60,000.

3. The method of claim 1 wherein the molecular weight of the polyethylene glycol employed is within the range of from 4,000 to 9,000.

4. The method of claim 1 wherein the said weight per cent of the said polyethylene glycol employed is from 1 to 3 weight per cent.

* * * * *

UNITED STATES PATENT OFFICE
CERTIFICATE OF CORRECTION

PATENT NO. : 3,898,312
DATED : August 5, 1975
INVENTOR(S) : Roscoe L. Pearce, Gerald C. Stalker and John L. Arnold It is certified that error appears in the above—identified patent and that said Letters Patent are hereby corrected as shown below:

Column 2, line 57, delete "polypropylene" and insert

--polyethylene--.

Signed and Sealed this eighth Day of June 1976

[SEAL]

Attest:

RUTH C. MASON
Attesting Officer

C. MARSHALL DANN
Commissioner of Patents and Trademarks